US012715149B2

(12) United States Patent
Keitzel et al.

(10) Patent No.: US 12,715,149 B2
(45) Date of Patent: Aug. 25, 2026

(54) MACHINE TOOL CONFIGURED FOR SUCCESSIVELY DEPLOYING A PLURALITY OF TOOLS TO MODIFY A WORKPIECE DURING A MANUFACTURING PROCESS

(71) Applicant: Kistler Holding AG, Winterthur (CH)

(72) Inventors: Gunnar Keitzel, Hettlingen (CH); Michael Heinemann, Ludwigsburg (DE); Stanko Tepsic, Schorndorf (DE)

(73) Assignee: Kistler Holding AG, Winterthur (CH)

( * ) Notice: Subject to any disclaimer, the term of this patent is extended or adjusted under 35 U.S.C. 154(b) by 482 days.

(21) Appl. No.: 18/323,482

(22) Filed: May 25, 2023

(65) Prior Publication Data

US 2023/0405849 A1 Dec. 21, 2023

(30) Foreign Application Priority Data

Jun. 20, 2022 (EP) .................................... 22179915

(51) Int. Cl.
*B25J 19/02* (2006.01)
*B23B 25/06* (2006.01)
(Continued)

(52) U.S. Cl.
CPC ............. *B25J 19/028* (2013.01); *B23B 25/06* (2013.01); *G01L 1/162* (2013.01); *G01L 5/0076* (2013.01); *B23B 2270/483* (2013.01)

(58) Field of Classification Search
CPC .. B25J 19/028; B23B 25/06; B23B 2270/483; G01L 1/162; G01L 5/0076; H04B 5/73;
(Continued)

(56) References Cited

U.S. PATENT DOCUMENTS 7,853,350 B2 * 12/2010 Jou ........................ B23Q 15/12
318/560
9,669,505 B2 * 6/2017 Angel .................... B23Q 17/00
(Continued)

FOREIGN PATENT DOCUMENTS

EP 1323495 A1 7/2003
JP 2017-205822 A 11/2017
(Continued)

OTHER PUBLICATIONS

JP Office Action with Translation, May 24, 2024, 9 pages.
Extended European Search Report with English translation for EP application No. 22179915.8, Dec. 9, 2022 13 pages.

*Primary Examiner* — Freddie Kirkland, III
(74) *Attorney, Agent, or Firm* — Dority & Manning, P.A.

(57) ABSTRACT

A procedure for measuring a measured variable in a process step of a manufacturing process uses a measurement chain with an evaluation unit and a plurality of measurement units having a sensor, a converter unit and a secondary antenna. The evaluation unit has a primary antenna. A measurement unit is positioned for measuring the measured variable and automatically coupled to the evaluation unit by establishing a transmission connection between the secondary antenna and the primary antenna. The sensor automatically generates measurement signals indicative of the measured variable. The converter unit automatically converts the measurement signals into measurement data, which the secondary antenna automatically transmits to the primary antenna.

17 Claims, 7 Drawing Sheets

(51) Int. Cl.
*G01L 1/16* (2006.01)
*G01L 5/00* (2006.01)

(58) Field of Classification Search
CPC ............ B23Q 1/0009; B23Q 2220/002; B23Q 17/0952; B23Q 17/00; B23Q 17/2233; B23Q 3/155; B23Q 7/1431; H04Q 2209/40; H04Q 9/00; G01D 21/02; H04W 4/38; G05B 19/401; G05B 19/4155
See application file for complete search history.

(56) References Cited

U.S. PATENT DOCUMENTS 10,070,203 B2 * 9/2018 Busslinger ............... H01Q 1/27
12,358,094 B2 * 7/2025 Gerber ............... B23Q 11/0042
2006/0085092 A1 * 4/2006 Redecker ............. B23Q 17/098 700/174
2008/0195244 A1 8/2008 Jou et al.
2016/0339554 A1 * 11/2016 Angel .................... B23Q 17/24
2017/0223433 A1 * 8/2017 Busslinger ............... H01Q 1/27
2017/0339515 A1 * 11/2017 Masakawa ............... B23Q 3/06
2018/0311779 A1 * 11/2018 Ziegltrum .......... B23Q 17/0985
2019/0001456 A1 * 1/2019 Kalhori .............. B23Q 17/0952
2019/0232377 A1 * 8/2019 Ostling .............. B23Q 17/2233
2023/0052650 A1 * 2/2023 Gerber ............... B23Q 17/0966
2023/0205166 A1 * 6/2023 Funaki ................ G05B 19/402 700/160

FOREIGN PATENT DOCUMENTS

JP 2020-104178 A 7/2020
JP 2022-71034 A 5/2022
WO WO 2015/176189 A1 11/2015
WO WO 2016/116804 A1 7/2016
WO WO 2020/058085 A1 3/2020

* cited by examiner

MACHINE TOOL CONFIGURED FOR SUCCESSIVELY DEPLOYING A PLURALITY OF TOOLS TO MODIFY A WORKPIECE DURING A MANUFACTURING PROCESS

FIELD OF THE INVENTION

The invention relates to a procedure for using a measuring chain, which includes an evaluation unit and a plurality of measurement units, for measuring a measured variable in a process step of a manufacturing process and resulting from an interaction of a machine tool with a workpiece. The invention also relates to a measurement chain for carrying out the procedure.

BACKGROUND OF THE INVENTION

Typically in a manufacturing process, a workpiece is machined by a tool. In this process, a measured variable such as a force, a torque, a bending moment, an acceleration, a vibration, etc. acts onto the tool. It is desirable to know the value of the measured variable for the control of the manufacturing process. For this purpose, a measurement chain is used that comprises a plurality of transmission links such as a sensor, a signal line and an evaluation unit. When the measured variable acts onto the sensor, the sensor generates measurement signals that are transmitted to the evaluation unit by the signal line. For an accurate measurement of the measured variable it is advantageous to mount the sensor as close as possible to the tool where the measured variable is not distorted.

Such a measurement chain is known from the document EP1323495A1. A rotating tool is associated with a sensor device, which sensor device comprises a sensor, an AD converter and a coil winding. The sensor detects the value of a measured variable that acts onto the rotating tool and generates measurement signals corresponding to the measured value. The AD converter digitizes the measurement signals to obtain measurement data. A stationary coil is associated with each sensor device. The measurement data are transmitted from the coil winding to the stationary coil by means of near-field telemetry. For this purpose, the coil winding and the stationary coil are arranged at a distance of a few millimeters from each other. In addition, the stationary coil supplies electrical energy to the sensor device. Thus, the sensor device does not need its own energy storage device. The stationary coil is connected to a main amplifier. The main amplifier evaluates the measurement data.

However, the document EP1323495A1 teaches to use a strain gauge as the sensor. In precision machining of a workpiece, the strain gauge has the disadvantage of a limited measuring range and a low dynamic measurement resolution as compared to a piezoelectric sensor. Thus, to obtain an optimum resolution of the measurement signals when using a strain gauge it is necessary to readjust the measuring range several times with changing magnitudes of the measurement signals which involves a lot of effort. Furthermore, a high dynamic measurement resolution with a measurement frequency of up to 35 kHz is particularly desirable for rapidly rotating workpieces.

Therefore, a moving system is known from WO2015176189A1, which corresponds to applicant's commonly owned US Patent Application Publication No. 2017-223433, which is hereby incorporated herein in its entirety for all purposes and in which a measurement unit comprises a piezoelectric sensor, an electronic unit, and a moving antenna. The electronic unit conditions and/or compresses measurement signals from the piezoelectric sensor into measurement data. The moving antenna transmits the measurement data to a fixed antenna by far-field telemetry. Since far-field telemetry is used, the two antennas can be positioned at a distance of several meters from each other. For an interference-free transmission of the measurement data, one of the two antennas is circularly polarized while the other of the two antennas is linearly polarized. The stationary antenna is connected to a data processing unit that processes the measurement data. For electrical energy supply, the measurement unit comprises its own energy storage device and/or its own energy generator.

Typically, manufacturing processes are comprised of a plurality of process steps carried out in a chronological sequence. For example, a workpiece is machined by a machine tool with various tools in a plurality of process steps. The various tools are positioned on the workpiece one after the other in a chronological sequence and/or the workpiece is positioned on a new tool from time to time. Thus, each process step involves changing a tool and/or the workpiece.

According to the teachings of the document EP1323495A1, a tool change is carried out and also the sensor device that is associated with the tool as well as the stationary coil thereof is changed with this tool change. The sensor device and its stationary coils are present multiple times for each tool. This makes the measurement chain expensive to purchase. Moreover, the measurement chain is interrupted for each tool change. For reconnecting the measurement chain, the sensor device and the stationary coil thereof must register with the main amplifier.

It is unavoidable to interrupt the measurement chain. Furthermore, according to the document WO2015176189A1, the transmission connection to the stationary antenna is interrupted during a change of the measurement unit and the moving antenna thereof. For reconnecting the measurement chain, the two antennas must re-establish the interrupted transmission connection.

For a fast and cost-effective manufacturing process, the time of latency in which a measurement chain is interrupted in a process step should be as short as possible.

OBJECTS AND SUMMARY OF THE INVENTION

It is a first object of the present invention to provide a procedure for enabling the measurement of at least one measured variable by means of a measurement chain in each of the process steps of a manufacturing process comprising a plurality of process steps, and in which a measurement chain that has been interrupted in a process step is rapidly reconnected. A second object of the invention is to provide said measurement of the measured variable with high accuracy, high dynamic measurement resolution and short time of latency.

Further, it is another object of the present invention to provide a measurement chain for carrying out the procedure, which measurement chain is inexpensive to purchase and which measurement chain can be integrated into the machine tool used for carrying out the steps of the process with as little effort as possible.

These objects as well as additional objects have been achieved by the procedure for measuring a measured variable in a process step of a manufacturing process and by the measurement chain for carrying out said procedure as described below.

The invention relates to a procedure for measuring a measured variable in a process step of a manufacturing process that is carried out by a machine too. The procedure uses a measurement chain that comprises a plurality of measurement units and an evaluation unit. Each of the measurement units comprises a sensor, a converter unit and a secondary antenna. The evaluation unit comprises a primary antenna. The machine tool is adapted to process a workpiece by a plurality of tools in a plurality of process steps in a chronological sequence, for which purpose a tool is positioned on the workpiece in each process step wherein a measurement unit is associated with each tool. Alternatively, the machine tool is adapted to machine a plurality of workpieces by one tool in a chronological sequence in a process step, for which purpose each workpiece is positioned on the tool in a chronological sequence wherein a measurement unit is associated with each workpiece. Alternatively, the machine tool is adapted to handle a workpiece by one of a plurality of tools in a process step, for which purpose one of the tools is positioned on the workpiece wherein a measurement unit is associated with each tool. In each of these alternative embodiments, the following steps of the procedure are carried out in the process step: by positioning a tool on the workpiece or a workpiece on the tool, the measurement unit associated with the positioned tool or the positioned workpiece is positioned in a measuring position for measuring the measured variable; automatically coupling the positioned measurement unit with the evaluation unit by establishing a transmission connection between the secondary antenna and the primary antenna; automatically generating measurement signals under the action of the measured variable by the sensor of the positioned measurement unit; automatically converting the measurement signals into measurement data by the converter unit of the positioned measurement unit; and automatically transmitting the measurement data to the primary antenna by the secondary antenna of the positioned measurement unit.

The invention also relates to a machine tool for carrying out the procedure wherein each of the measurement units positioned in the measuring position can be coupled with the evaluation unit for establishing a transmission connection between the secondary antenna and the primary antenna.

In the procedure according to the invention, each process step involves moving and positioning one of the plurality of measurement units into a measuring position. The measured variable is measured by the positioned measurement unit being in this measuring position during the process step. However, moving and positioning the measurement unit into the measuring position results in an interruption of the measurement chain between the measurement unit and the evaluation unit. However, the measurement chain according to the invention can be reconnected by coupling the positioned measurement unit with the evaluation unit. This coupling establishes a transmission connection between the secondary antenna of the positioned measurement unit and the primary antenna of the evaluation unit. The measurement chain is reconnected by this coupling. This coupling occurs automatically. For the purposes of the present invention, the adverb “automatically” means that the transmission connection is established automatically by the positioned measurement unit and the evaluation unit without human intervention. This automatic coupling leads to quick reconnection of the measurement chain.

Additional advantageous embodiments are described in greater detail below.

BRIEF DESCRIPTION OF THE DRAWINGS

In the following, the will be explained in more detail by way of example with reference to the Figures in which.

DETAILED DESCRIPTION OF EXEMPLARY EMBODIMENTS

Figure 1:
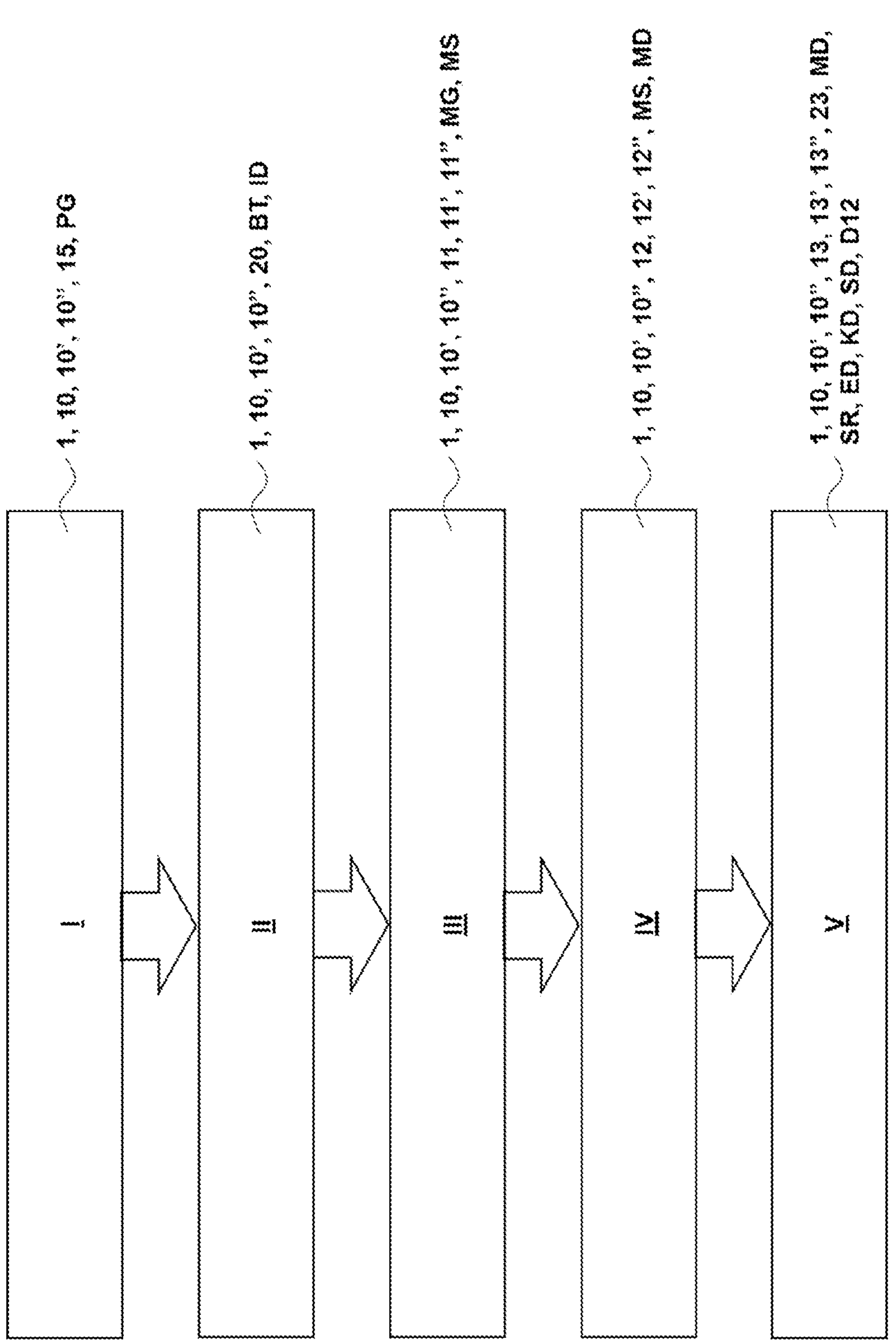
FIG. 1 shows a flow chart of procedural steps of the procedure for measuring a measured variable MG in a process step of a manufacturing process.

FIG. 1 shows a flowchart of procedural steps of the procedure for measuring a measured variable MG in a process step of a manufacturing process. The measured variable MG is a force, a torque, a bending moment, an acceleration, a vibration, etc.

A measurement chain 1 comprising a plurality of measurement units 10, 10', 10" and an evaluation unit 20 is used for carrying out the procedure for measuring a measured variable MG in a process step of a manufacturing process. FIGS. 2 to 7 show portions of three embodiments of a measurement chain 1 for carrying out the procedure. First, the measurement chain 1 will be described in general terms. Afterwards, further details of the measurement chain 1 will be explained in sections dedicated to each of the three embodiments.

Each of the plurality of measurement units 10, 10', 10" comprises a sensor 11, 11', 11", a converter unit 12, 12', 12", and a secondary antenna 13, 13', 13". For example, the plurality of measurement units 10, 10', 10" include a first measurement unit 10 comprising a first sensor 11, a first converter unit 12, and a first secondary antenna 13, a second measurement unit 10' comprising a second sensor 11', a second converter unit 12', and a second secondary antenna 13, and a third measurement unit 10" comprising a third sensor 11", a third converter unit 12", and a third secondary antenna 13". The number of measuring units is not limited to these three 10, 10', 10" that are discussed in the following examples to explain the invention.

Figure 3:
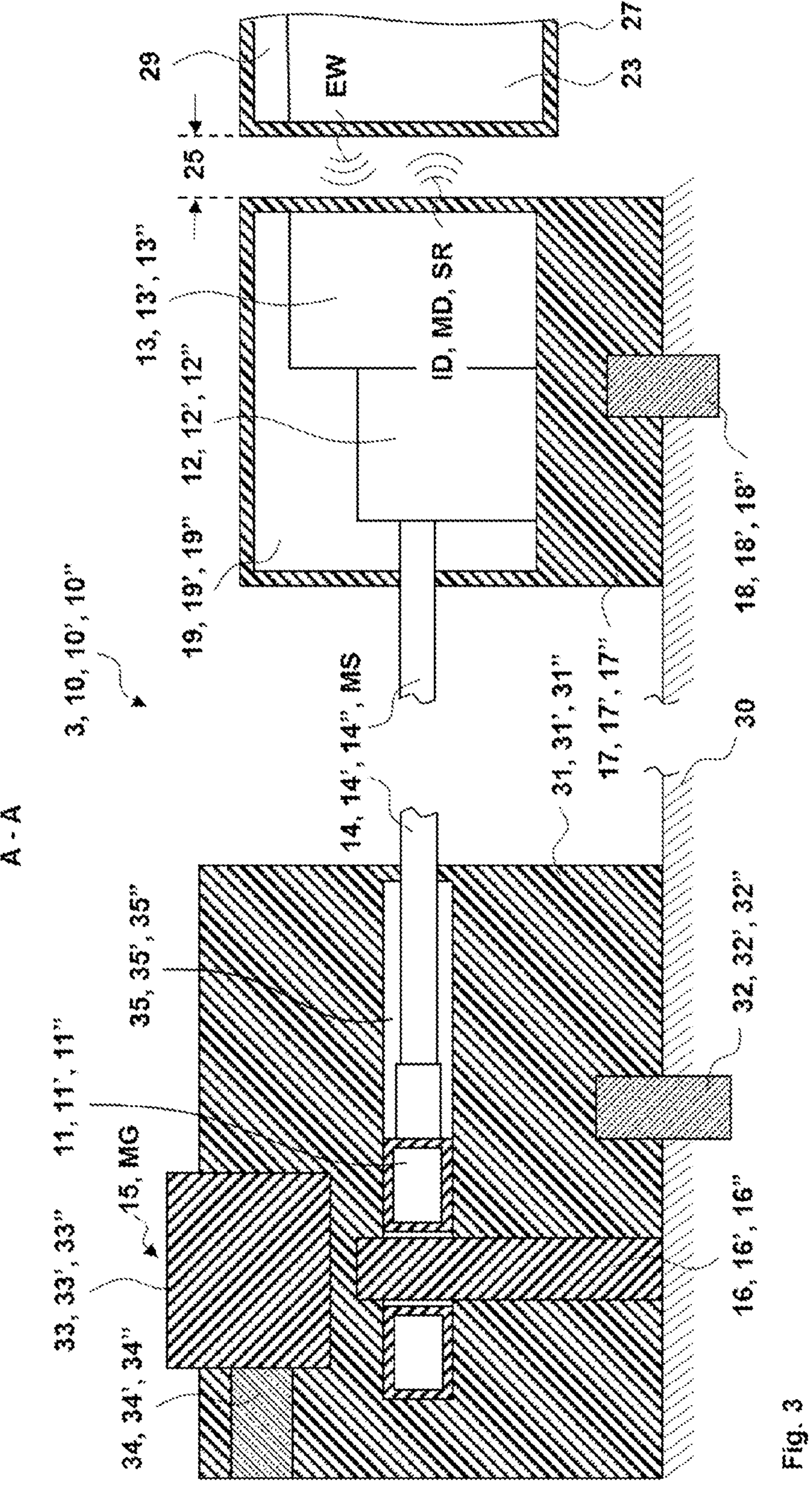
FIG. 3 shows a cross-sectional view of a portion of the first machine tool 3 according to FIG. 2 taken in the direction of the arrows designated A-A along the chain-dashed line in FIG. 2.
Figure 5:
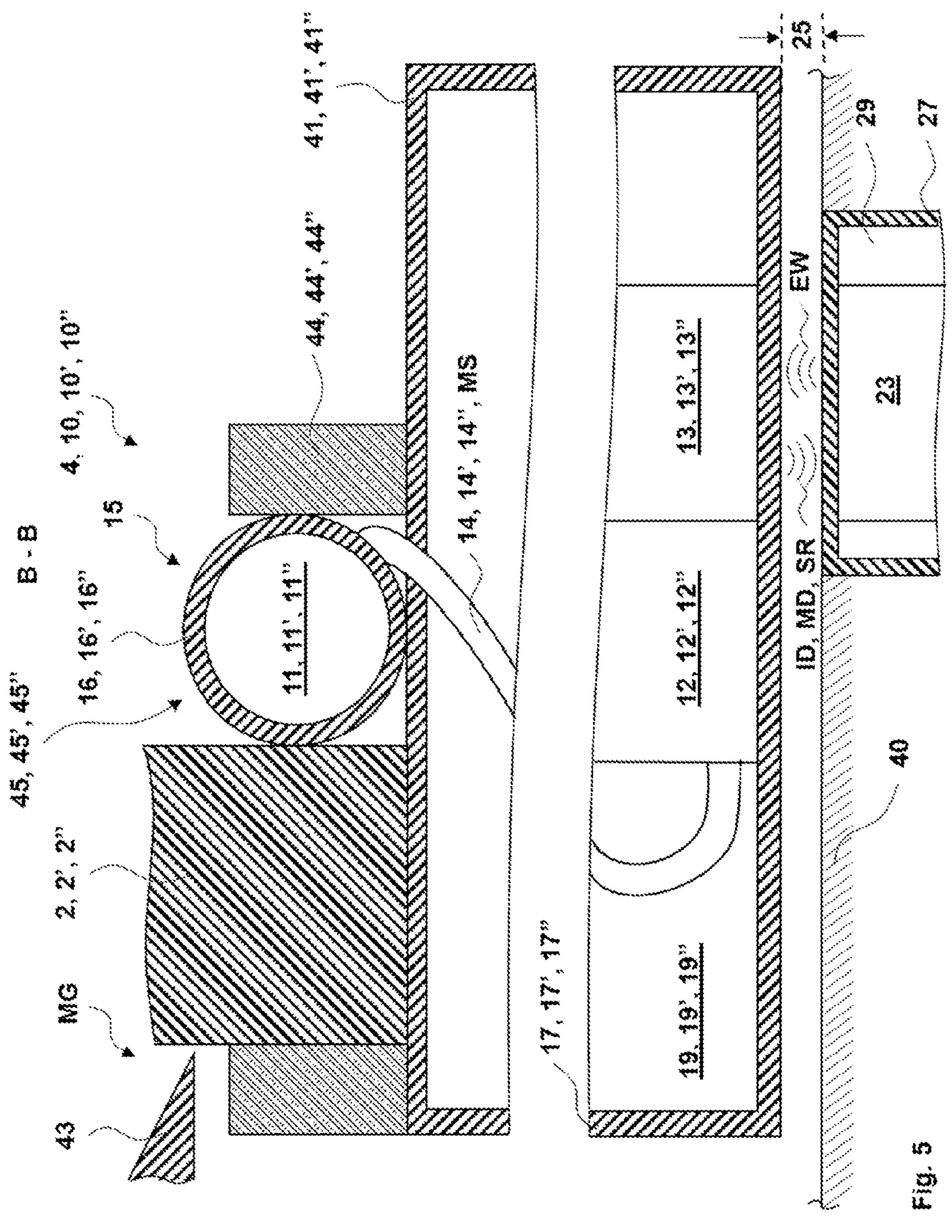
FIG. 5 shows a portion of the second machine tool 4 according to FIG. 4 in cross-section taken in the direction of the arrows designated B-B along the chain-dashed line in FIG. 4.
Figure 7:
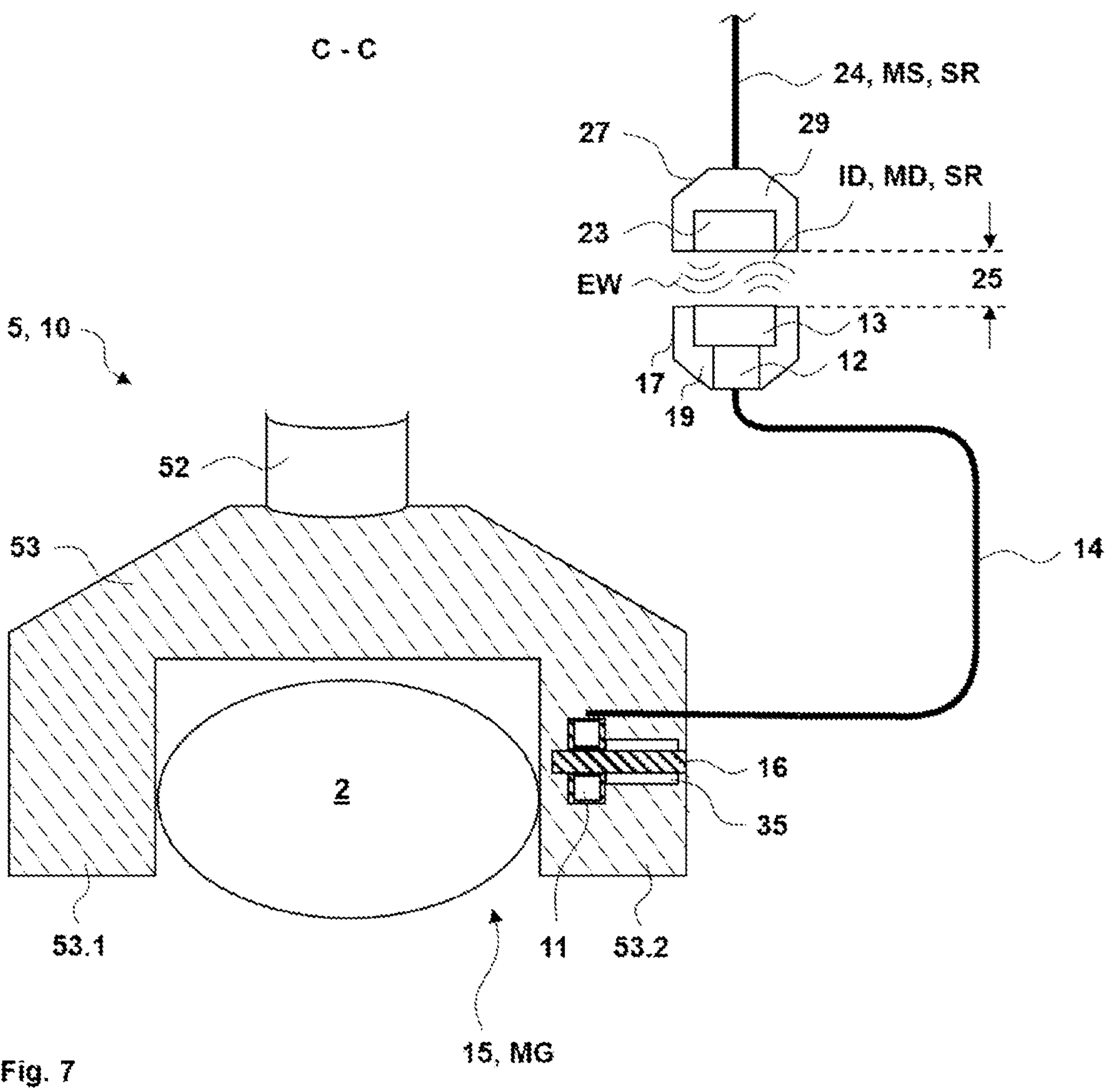
FIG. 7 shows a portion of the third machine tool 4 according to FIG. 6 in cross-section taken in the direction of the arrows designated C-C along the chain-dashed line in FIG. 6.

Each of the plurality of measurement units 10, 10', 10" comprises a secondary housing 17, 17', 17" schematically shown in FIGS. 3, 5 and 7 for example. Thus, a plurality of secondary housings 17, 17', 17" are present. For example, the plurality of secondary housings 17, 17', 17" comprise a first secondary housing 17 comprising a first secondary interior space 19 for accommodating the first converter unit 12 and the first secondary antenna 13, a second secondary housing 17' comprising a second secondary interior space 19' for accommodating the second converter unit 12' and the second secondary antenna 13', and a third secondary housing 17" comprising a third secondary interior space 19" for accommodating the third converter unit 12' and the third secondary antenna 13". Each of the plurality of secondary housings 17, 17', 17" is desirably made of mechanically resistant material such as sheet metal, plastics, etc.

In addition, the evaluation unit 20 comprises a primary housing 27 for accommodating a primary antenna 23. As schematically shown in FIG. 3 for example, the primary housing 27 defines a primary interior space 29. The primary antenna 23 is disposed in the primary interior space 29. The primary interior space 29 protects the primary antenna 23 from detrimental external conditions such as dirt, coolant, electromagnetic interference, etc. The primary housing 27 is also made of mechanically resistant material such as sheet metal, plastics, etc.

In a first step of the procedure schematically represented in FIG. 1, the positioning I of one of the plurality of measurement units 10, 10', 10" in a measuring position 15 for measuring the measured variable MG is carried out. The measurement unit 10, 10', 10" is moved to the measuring position 15 and is left in this measuring position 15 during the process step.

A second step of the procedure schematically represented in FIG. 1 involves automatically coupling II the positioned measurement unit 10, 10', 10" with the evaluation unit 20 by establishing a transmission connection between the secondary antenna 13, 13', 13" and the primary antenna 23.

For this coupling II of the positioned measurement unit 10, 10', 10" with the evaluation unit 20, the primary antenna 23 generates an electromagnetic alternating field EW and radiates the electromagnetic alternating field EW. In FIGS. 3 and 5, the electromagnetic alternating field EW is represented by curved circle segments. Preferably, the electromagnetic alternating field EW has a frequency of 125 kHz. The range of the electromagnetic alternating field EW is limited in such a way that only the secondary antenna 13, 13', 13" of a measurement unit 10, 10', 10" that is fully positioned in the measuring position 15 is able to receive the electromagnetic alternating field EW.

As soon as and as long as the secondary antenna 13, 13', 13" receives the electromagnetic alternating field EW, electrical energy is supplied to the measurement unit 10, 10', 10". Preferably, the secondary antenna 13, 13', 13" is an induction coil having several turns and a capacitor. The electromagnetic alternating field EW induces an electrical voltage in the induction coil, which electrical voltage charges the capacitor with electrical energy. The electrical energy is used for operating the measurement unit 10, 10', 10". With the capacitor charged, the measurement unit 10, 10', 10" is supplied with sufficient electrical energy for operating the measurement unit 10, 10', 10". Preferably, the capacitor is charged within a ready for operation time BT of 100 ms, preferably within a ready for operation time BT of 20 ms.

When the measurement unit 10, 10', 10" is ready for operation, the secondary antenna 13, 13', 13" establishes a transmission connection to the primary antenna 23. Preferably, the establishing of the transmission connection to the primary antenna 23 occurs immediately after the measurement unit 10, 10', 10" has reached the ready for operation status. For establishing the transmission connection to the primary antenna 23, the secondary antenna 13, 13', 13" transmits an identification number ID to the primary antenna 23. The identification number ID is stored in a data memory of the measurement unit 10, 10', 10". Preferably, the data memory is arranged in the converter unit 12, 12', 12". The identification number ID identifies the measurement unit 10, 10', 10" in an unambiguous manner. The primary antenna 23 receives the identification number ID. In FIGS. 3 and 5, the transmission of the identification number ID is shown as curved circle segments. The primary antenna 23 forwards the identification number ID to the evaluation unit 20. The evaluation unit 20 identifies the measurement unit 10, 10', 10" on the basis of the received and transmitted identification number ID. With receiving the identification number ID and identifying the measurement unit 10, 10', 10", the coupling II of the positioned measurement unit 10, 10', 10" with the evaluation unit 20 is completed.

In a third step of the procedure schematically represented in FIG. 1, automatic generation 11 of measurement signals MS by the sensor 11, 11', 11" of the positioned measurement unit 10, 10', 10" occurs under the action of the measured variable MG.

The sensor 11, 11', 11" is adapted to detect the measured variable MG and to generate measurement signals MS for the measured variable MG detected. The sensor 11, 11', 11" detects and generates a measurement signal MS per time unit. The time unit may be one millisecond (ms), 100 microseconds (100 μs), etc. The reciprocal of the time unit is the dynamic measurement resolution. Thus, the sensor 11, 11', 11" generates a sequence of measurement signals MS in time where each measurement signal MS has a magnitude and a time.

The sensor 11, 11', 11" may be a piezoelectric sensor, a piezoresistive sensor, a strain gauge, and the like. Each sensor 11, 11', 11" includes a signal cable 14, 14', 14" schematically represented in FIGS. 2-7 for example. The signal cable 14, 14', 14" is configured for transmitting the measurement signals MS to the converter unit 12, 12', 12".

Preferably, the sensor 11, 11', 11" is a piezoelectric sensor. The piezoelectric sensor comprises piezoelectric material such as quartz, piezoceramics, etc. The measured variable MG acts onto the piezoelectric material in the form of tensile and/or compressive loads. Under the action of the measured variable MG, the piezoelectric material generates measurement signals MS in the form of electrical charge. The amount of electrical charge is proportional to the numerical value of the measured variable MG. According to FIGS. 3, 5 and 7, the piezoelectric sensor is mechanically preloaded with a preload force by using preloading means 16, 16', 16" such as a screw, a sleeve, etc. Due to this mechanical preloading, the piezoelectric material is able to detect both tensile and compressive loads. The piezoelectric sensor is characterized by a high dynamic measurement resolution of up to 35 kHz.

In a fourth step of the procedure schematically represented in FIG. 1, an automatic conversion IV of the measurement signals MS by the converter unit 12, 12', 12" of the positioned measurement unit 10, 10', 10" into measurement data MD is performed.

The converter unit 12, 12', 12" is adapted to digitize the measurement signals MS to obtain measurement data MD. Preferably, the converter unit 12, 12', 12" for a piezoelectric sensor comprises a charge amplifier. The charge amplifier amplifies and converts the electrical charge of the piezoelectric sensor into an electric voltage. The converter unit 12, 12', 12" digitizes the electric voltage into measurement data MD. The magnitude and timing of the measurement signals MS is converted into a magnitude and timing of the measurement data MD and is digitized.

Preferably, the converter unit 12, 12', 12' is adapted to generate unit data ED denoting the unit of the measured variable MG for which the converter unit 12, 12', 12" has converted and digitized measurement signals MS into measurement data MD. For example, a measured variable MG being a force will have the unit Newton (N), a measured variable MG being a torque or a bending moment will have the unit Newtonmeter (Nm), and a measured variable MG being an acceleration or a vibration will have the unit acceleration due to gravity (g).

Preferably, the converter unit 12, 12', 12' is adapted to read calibration data KD of the sensor 11, 11', 11" from the data memory of the measurement unit 10, 10', 10", which sensor 11, 11', 11" has generated the measurement signals MS under the action of the measured variable MG. The calibration data KD specify the sensitivity of the sensor 11, 11', 11" as a function of the temperature at which the sensor 11, 11', 11" has generated the measurement signals MS. For a piezoelectric sensor, the calibration data KD may also specify the sensitivity of the sensor 11, 11', 11" as a function of the magnitude of the mechanical preloading force at which the sensor 11, 11', 11" has generated the measurement signals MS.

Preferably, the converter unit 12, 12', 12' is adapted to read serial number data SD of the converter unit 12, 12', 12" from the data memory of the measurement unit 10, 10', 10". The serial number data SD unambiguously identifies the converter unit 12, 12', 12" which converts and digitizes the measurement signals MS into measurement data MD.

Further, in a fifth step of the procedure schematically represented in FIG. 1, automatic transmission V of the measurement data MD by the secondary antenna 13, 13', 13" of the positioned measurement unit 10, 10', 10" to the primary antenna 23 is performed.

The secondary antenna 13, 13', 13" is adapted to transmit the measurement data MD to the primary antenna 23. Preferably, the secondary antenna 13, 13', 13" transmits the measurement data MD to the primary antenna 23 with a carrier frequency of 13.56 MHz and a high transmission rate SR of up to 1.6 MBit/s. Thus, the sensor 11, 11', 11" is able to measure the measured variable MG with high dynamic measurement resolution of up to 35 kHz and the secondary antenna 13, 13', 13" is able to transmit the measurement data MD to the primary antenna 23 at a resolution of up to 24 bit with a transmission rate SR of up to 1.6 MBit/s.

Preferably, the secondary antenna 13, 13', 13" is adapted to transmit the unit data ED, the calibration data KD and the serial number data SD together with the measurement data MD to the primary antenna 23.

Preferably, the evaluation unit 20 comprises a data memory with converter unit-specific data D12 stored therein. The converter unit-specific data D12 include for the converter units 12, 12', 12" of the measurement chain 1 a time constant of a converter unit 12, 12', 12", a noise of a converter unit 12, 12', 12", etc. The evaluation unit 20 is adapted to assign converter unit-specific data D12 of that converter unit 12, 12', 12" that has converted and digitized the measurement signals MS into measurement data MD to the serial number data SD transmitted with the measurement data MD. The evaluation unit 20 reads the assigned converter unit-specific data D12 from the data memory.

The evaluation unit 20 is adapted to evaluate the measurement data MD. For example, the evaluation unit 20 displays a graphical representation of the measurement data MD as a sequence in time where the ordinate indicates the magnitude of the measurement data MD and the abscissa indicates the time of the measurement data MD. When evaluating the measurement data MD, the evaluation unit 20 takes into account the unit data ED, the calibration data KD and the converter unit-specific data D12. Preferably, the evaluation unit 20 indicates the unit data ED in the graphical representation. Preferably, the evaluation unit 20 corrects the measurement data MD by the calibration data KD and by the converter unit-specific data D12. For example, the evaluation unit 20 multiplies the magnitude of the individual measurement data MD by the sensitivity of the sensor 11, 11', 11" as a function of the temperature and/or by the sensitivity of the sensor 11, 11', 11" as a function of the mechanical preloading force. For example, the evaluation unit 20 filters the measurement data MD by the time constant of the converter unit 12, 12', 12" and/or represents the noise of the converter unit 12, 12', 12" in the form of error bars in the graphical representation. All these measures increase the accuracy of the measurement of the measured variable MG.

First Embodiment

Figure 2:
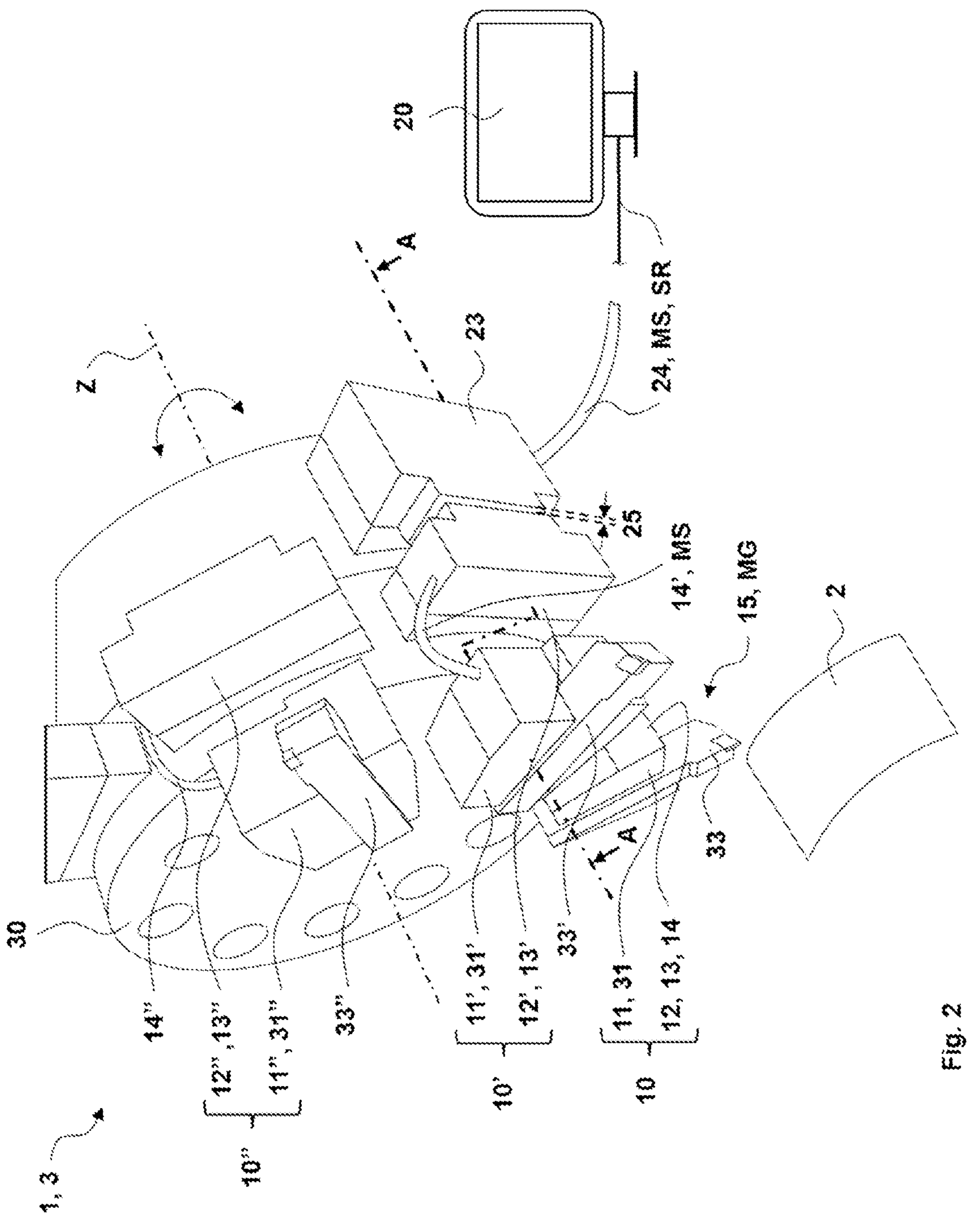
FIG. 2 shows in a perspective view, a portion of a first embodiment of a measurement chain 1 for carrying out the procedure according to FIG. 1 where the measurement chain 1 is part of a first machine tool 3.

In the first embodiment according to FIG. 2, the measurement chain 1 is a component of a first machine tool 3 such as a lathe, a turret lathe, etc. Details of the first machine tool 3 are shown in FIG. 3. Preferably, the first machine tool 3 is a turret lathe comprising a turret 30 and a plurality of tool holders 31, 31', 31" arranged on the turret 30. The tool holders 31, 31', 31" are mounted on the turret 30 in a changeable manner. Preferably, as schematically shown in FIG. 3, the tool holders 31, 31', 31" are attached to the turret 30 by attaching means 32, 32', 32" such as screws, bolts, etc. The turret 30, tool holders 31, 31', 31" and attaching means 32, 32', 32" are made of mechanically resistant material such as steel, tool steel, etc.

Each tool holder 31, 31', 31" receives a tool 33, 33', 33". The tool 33, 33', 33" is also made of mechanically resistant material such as steel, tool steel, etc. Preferably, the tool 33, 33', 33" is clamped in the tool holder 32, 32', 32" by means of a clamping means 34, 34', 34" such as a screw, pin, etc. The tool 33, 33', 33" has a cutting blade made of a hard, solid and tough cutting material such as metal, ceramics, etc. FIG. 2 shows three tool holders 31, 31', 31" and three tools 33, 33', 33", for example. The three tool holders 31, 31', 31" and the three tools 33, 33', 33" comprise an arrangement or assembly that includes a first tool holder 31 that receives a first tool 32, a second tool holder 31' that receives a second tool 32', and a third tool holder 31" that receives a third tool 33".

The turret 30 is movably arranged on the first machine tool 3. On the first machine tool 3, the turret 30 is rotatable about a longitudinal axis Z in directions that are schematically depicted in FIG. 2 by a curved double arrow. By rotating the turret 30 about the longitudinal axis Z, the tools 33, 33', 33" can be positioned on a workpiece 2 one after the other in a time sequence. The workpiece 2 schematically shown in FIG. 2 desirably can be formed of any material such as metal, plastics, glass, etc. The workpiece 2 is processed by the tools 33, 33', 33" in several process steps in a chronological sequence. For each process step, first one of the tools 33, 33', 33" is positioned on the workpiece 2, and then the workpiece 2 is machined by the positioned tool 33, 33', 33". As shown in FIG. 2, the first tool 33 is positioned on the workpiece 2, for example. The measured variable MG to be measured acts onto the positioned tool 33, 33', 33" during machining. Preferably, a change of the tools 33, 33', 33" on the workpiece 2 occurs within a setup time of 500 ms.

A measurement unit 10, 10', 10" is assigned to each tool holder 31, 31', 31". According to FIG. 2, three tool holders 31, 31', 31" and three measurement units 10, 10', 10" are shown, for example. The three measurement units 10, 10', 10" comprise a first measurement unit 10 of a first tool holder 31, a second measurement unit 10' of a second tool holder 31' and a third measurement unit 10" of a third tool holder 31". Each measurement unit 10, 10', 10" comprises a sensor 11, 11', 11", a converter unit 12, 12', 12" and a secondary antenna 13, 13', 13".

According to FIG. 3, each tool holder 31, 31', 31" defines a recess 35, 35', 35" disposed internally of the respective tool holder 31, 31', 31". The sensor 11, 11', 11" of the measurement unit 10, 10', 10" associated with the tool holder 31, 31', 31" is arranged in the recess 35, 35', 35". Preferably, the recess 35, 35', 35" is located inside the tool holder 31, 31', 31" and the sensor 11, 11', 11" is completely accommodated within the recess 35, 35', 35". The recess 35, 35', 35" shields and protects the sensor 11, 11', 11" from detrimental external conditions such as dirt, coolant, electromagnetic radiation, etc. The tool holder 31, 31', 31" further defines a feedthrough which guides the signal cable 14, 14', 14" out of the recess 35, 35', 35" to the outside of the tool holder 31, 31', 31". The feedthrough is configured so as to be watertight.

Preferably, the secondary housing 17, 17', 17" is arranged on the turret 30. The secondary housing 17, 17', 17" is retained on the turret 30 by retaining means 18, 18', 18" such as screws, bolts, etc. The secondary housing 17, 17', 17" is arranged at a spatial distance from the sensor 11, 11', 11". Preferably, the secondary housing 17, 17', 17" is arranged at a constant spatial distance of less than/equal to 10 cm from the sensor 11, 11', 11".

When a tool holder 31, 31', 31" is changed on the turret 30, the tool holder 31, 31', 31" is changed together with the measurement unit 10, 10', 10" associated therewith. For this purpose, the tool holder 31, 31', 31" to be changed is removed from the turret 30 by loosening its attaching means 32, 32', 32", and the secondary housing 17, 17', 17" connected thereto by the signal cable 14, 14', 14" is removed by loosening its retaining means 18, 18', 18". Afterwards, the new tool holder 31, 31', 31" is attached to the turret 30 by its attachment means 32, 32', 32", and the secondary housing 17, 17', 17" connected thereto by the signal cable 14, 14', 14" is attached to the turret 30 by its retaining means 18, 18', 18". Changing the tool holder 31, 31', 31" together with the associated measurement unit 10, 10', 10" is accomplished quickly and easily.

According to FIG. 2, the first measurement unit 10 is positioned in the measuring position 15 and the first sensor 11 of the first measurement unit 10 detects the measured variable MG acting onto the first tool 33, for example.

While the sensors 11, 11', 11" and the secondary housings 17, 17', 17" are movably arranged on the first machine tool 3 since they are indeed rotatable on the turret 30 about the longitudinal axis Z, the primary housing 27 schematically shown in FIG. 3 has a stationary arrangement on the first machine tool 3. Preferably, the primary housing 27 is attached to the turret 30 by fastening means such as screws, bolts, etc. that are not shown in the Figure. Accordingly, each respective secondary housing 17, 17', 17" is movable with respect to the primary housing 27.

For a measurement unit 10, 10', 10" that is positioned in the measuring position 15 schematically shown in FIG. 2 for example, the first machine tool 3 is adapted to position the secondary housing 17, 17', 17" of the measurement unit 10, 10', 10" positioned in the measuring position 15 at a transmission distance 25 from the primary housing 27. Preferably, the transmission distance 25 between the secondary housing 17, 17', 17" of the measurement unit 10, 10', 10" positioned in the measuring position 15 and the primary housing 27 is equal to the range of the electromagnetic alternating field EW.

Second Embodiment

Figure 4:
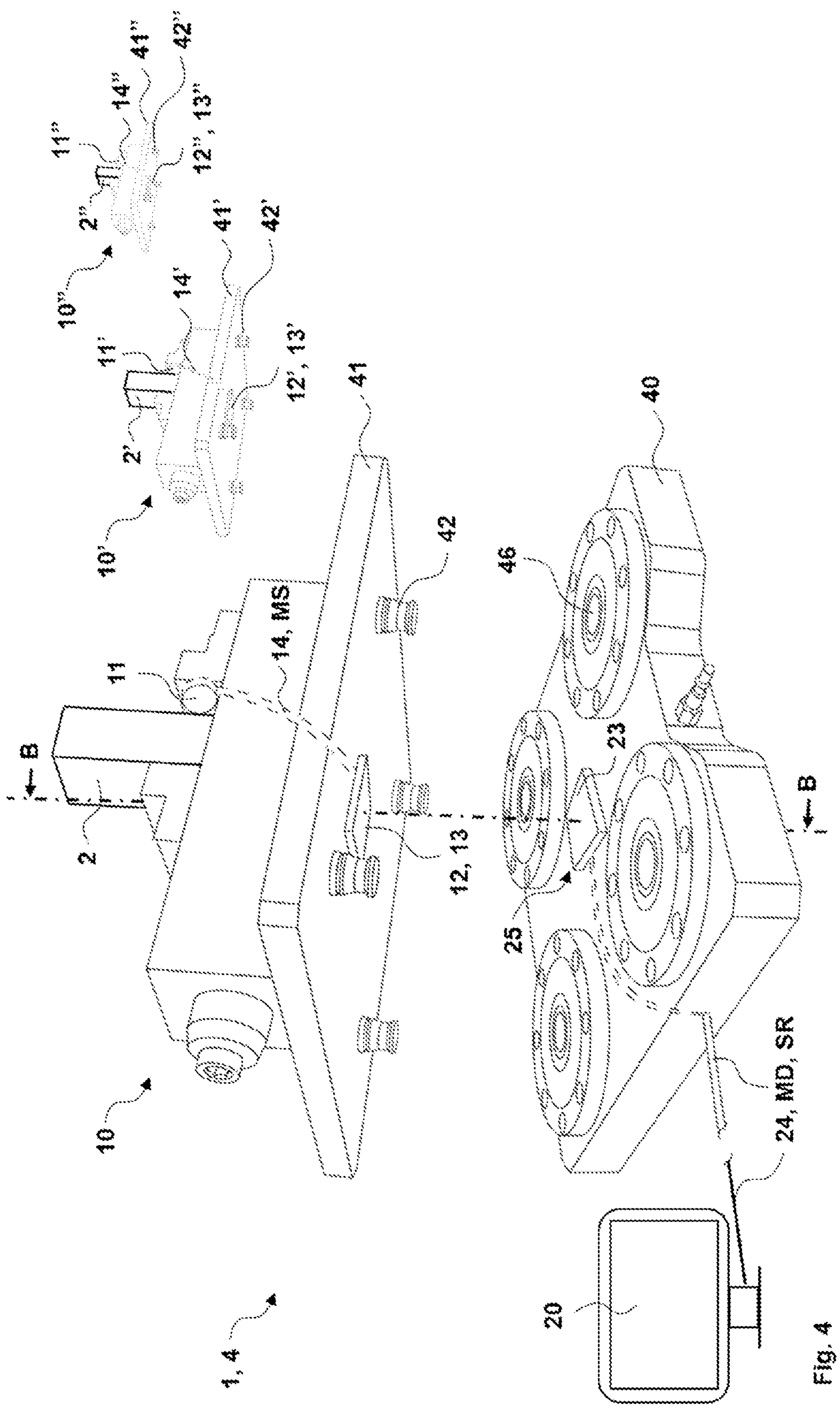
FIG. 4 shows in a perspective view, a portion of a second embodiment of a measurement chain 1 for carrying out the procedure according to FIG. 1 where the measurement chain 1 is a component of a second machine tool 4.

In the second embodiment according to FIG. 4, the measurement chain 1 is a portion of a second machine tool 4 such as a clamping system, a zero point clamping system, etc. Details of the second machine tool 4 are represented in FIG. 5. Preferably, the second machine tool 4 is a zero point clamping system comprising a carrier unit 40 and a plurality of clamping units 41, 41', 41". In each case, one of the plurality of clamping units 41, 41', 41" is changeably mounted on the carrier unit 40. The clamping units 41, 41', 41" can be changed without zero point loss in the zero point clamping system.

Preferably, the plurality of clamping units 41, 41', 41" are secured in clamping modules 46 of the carrier unit 40 by clamping means 42, 42', 42" such as pins, bolts, etc. According to FIG. 4, each of the plurality of clamping units 41, 41', 41" comprises four clamping means 42, 42', 42" that can be secured in four clamping modules 46 of the carrier unit 40, for example. After the clamping means 42, 42', 42" are inserted in the clamping modules 46, the clamping means 42, 42', 42" are held in place in the clamping modules 46 by positive locking such as by a spring force. Releasing of the attachment occurs pneumatically. Preferably, the clamping units 41, 41', 41" can be changed within a setup time of 500 ms. The carrier unit 40, the clamping units 41, 41', 41", the clamping means 42, 42', 42" and the clamping modules 46 are made of mechanically resistant material such as steel, tool steel, etc.

Each of the plurality of clamping units 41, 41', 41" accommodates a workpiece 2, 2', 2". The workpiece 2, 2', 2" is made of any material such as metal, plastics, glass, etc. Preferably, the workpiece 2, 2', 2" is clamped in the clamping unit 41, 41', 41" by a clamping means 44, 44', 44" such as a vice, a clamp, etc. According to FIG. 4, three clamping units 41, 41', 41" and three workpieces 2, 2', 2" are shown, for example. The three clamping units 41, 41', 41" and the three workpieces 2, 2', 2" comprise a first clamping unit 41 that accommodates a first workpiece 2, a second clamping unit 41' that accommodates a second workpiece 2', and a third clamping unit 41" that accommodates a third workpiece 2".

Thus, there are a plurality of workpieces 2, 2', 2". The second machine tool 4 is adapted to machine each of the plurality of workpieces 2, 2', 2" by a tool 43 schematically shown in FIG. 5 in a process step. For this purpose, the workpieces 2, 2', 2" accommodated in the clamping units 41, 41', 41" are sequentially positioned on the tool 43 of the second machine tool 4 in a chronological sequence, and then each positioned workpiece 2, 2', 2" is machined by the tool 43. According to FIG. 5, the tool 43 comprises a cutting blade made of a hard, solid and tough cutting material such as metal, ceramics, etc. During machining step, the measured variable MG to be detected acts on the positioned workpiece 2, 2', 2".

A measurement unit 10, 10', 10" is arranged at each of the plurality of clamping units 41, 41', 41". According to FIG. 4, three clamping units 41, 41', 41" and three measurement units 10, 10', 10" are shown, for example. The three measurement units 10, 10', 10" comprise a first measurement unit 10 associated with the first clamping unit 41, a second measurement unit 10' associated with the second clamping unit 41', and a third measurement unit 10" associated with the third clamping unit 41".

According to FIG. 5, the respective measurement unit 10, 10', 10" is positioned in the measuring position 15 and the respective sensor 11, 11', 11" of the respective measurement unit 10, 10', 10" detects the measured variable MG acting on the workpiece 2, 2', 2".

Preferably, the respective measurement unit 10, 10', 10" is clamped in the respective clamping means 44, 44', 44" together with the respective workpiece 2, 2', 2". As schematically shown in FIG. 5, the respective sensor 11, 11', 11" is clamped in a respective recess 45, 45', 45" in close spatial proximity to the respective workpiece 2, 2', 2". According to FIG. 5, the respective sensor 11, 11', 11" is clamped in direct mechanical contact with the respective workpiece 2, 2', 2".

Preferably, the secondary housing 17, 17', 17" is arranged on the clamping unit 41, 41', 41". Preferably, the respective secondary housing 17, 17', 17" is identical to a housing of the respective clamping unit 41, 41', 41" in certain regions. The respective secondary housing 17, 17', 17" is arranged at a spatial distance from the respective sensor 11, 11', 11". Preferably, the respective secondary housing 17, 17', 17" is arranged at a constant spatial distance of less than/equal to 10 cm from the respective sensor 11, 11', 11".

For changing a respective workpiece 2, 2', 2" held in the respective clamping unit 41, 41', 41", the respective clamping means 44, 44', 44" can be detached from the respective workpiece 2, 2', 2" to be changed and reconnected with a new workpiece 2, 2', 2". Preferably, the respective sensor 11, 11', 11" is left in the respective recess 45, 45', 45" during the change. Only the workpiece 2, 2', 2" is changed. Releasing and reestablishing the clamping of the workpiece 2, 2', 2" and the sensor 11, 11', 11" is simple and quick. Thus, the workpiece 2, 2', 2" can be changed while the sensor 11, 11', 11" and the secondary housing 17, 17', 17" with the converter unit 12, 12', 12" and the secondary antenna 13, 13', 13" remain on the clamping unit 41, 41', 41".

While the sensors 11, 11', 11" and the secondary housings 17, 17', 17" are arranged on the second machine tool 4 in a movable manner since they are indeed changeably attached to the carrier unit 40 by the clamping units 41, 41', 41", the primary housing 27 schematically shown in FIG. 5 is arranged on the second machine tool 4 in a stationary manner. Preferably, the primary housing 27 is identical with a housing of the carrier unit 40 in certain regions. The secondary housing 17, 17', 17" and the primary housing 27 are movable relative to each other.

As schematically shown in FIG. 5, a measurement unit 10, 10', 10" positioned in the measuring position 15, the second machine tool 4 is adapted to position the secondary housing 17, 17', 17" of the measurement unit 10, 10', 10" positioned in the measuring position 15 at a transmission distance 25 from the primary housing 27. Preferably, the transmission distance 25 is less than/equal to 10 mm. Preferably, the transmission distance 25 between the secondary housing 17, 17', 17" of the measurement unit 10, 10', 10" positioned in the measuring position 15 and the primary housing 27 is equal to the range of the electromagnetic alternating field EW.

Third Embodiment

Figure 6:
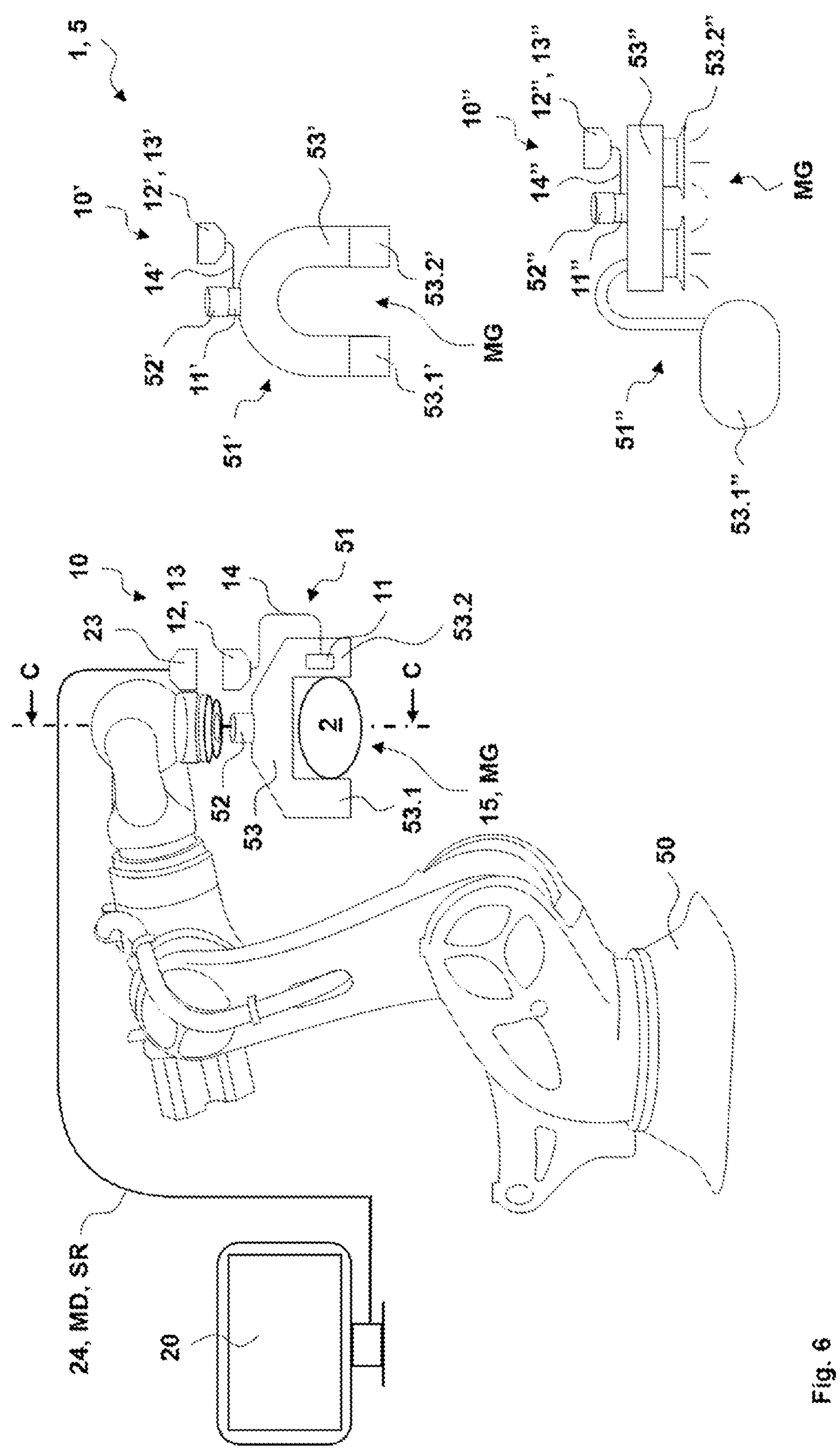
FIG. 6 shows in a perspective view, a portion of a third embodiment of a measurement chain 1 for carrying out the procedure according to FIG. 1 where the measurement chain 1 is a component of a third machine tool 4.

In the third embodiment according to FIG. 6, the measurement chain 1 is a component of a third machine tool 5 such as an industrial robot, an industrial robot with changeable heads, etc. Details of the third machine tool 5 are shown in FIG. 7. Preferably, the third machine tool 5 is an industrial robot comprising a manipulator 50 and a plurality of changeable heads 51, 51', 51". Each of the plurality of changeable heads 51, 51', 51" is changeably mounted on the manipulator 50. Preferably, the changeable heads 51, 51', 51" are attached to the manipulator 50 by coupling means 52, 52', 52" such as connectors, media couplings, etc. As used herein, media couplings includes coupling apparatus that employs fluids such as pressurized air, whether positive or negative (i.e., vacuum) and hydraulic fluid. Preferably, the changeable heads 51, 51', 51" on the manipulator 50 can be changed within a setup time of 500 ms. The manipulator 50, the changeable heads 51, 51', 51" and the coupling means 52, 52', 52" are made of mechanically resistant material such as steel, tool steel, etc.

Each of the plurality of changeable heads 51, 51', 51" accommodates a tool 53, 53', 53". Referring to FIG. 6, three changeable heads 51, 51', 51" with three tools 53, 53', 53" are shown, for example. The three changeable heads 51, 51', 51" and the three tools 53, 53', 53" include a first changeable head 51 that accommodates a first tool 53, a second changeable head 51' that accommodates a second tool 53', and a third changeable head 51" that accommodates a third tool 53".

The first tool 53 schematically shown in FIG. 6 is embodied as a parallel gripper comprising two gripping arms 53.1, 53.2 between which a gripping force can be exerted. The gripping force is a measured variable MG.

The second tool 53' schematically shown in FIG. 6 is embodied as a magnetic gripper comprising two magnets 53.1', 53.2' between which a magnetic attraction force can be exerted. The magnetic attraction force is a measured variable MG.

The third tool 53'" schematically shown in FIG. 6 is embodied as a suction gripper comprising a vacuum pump 53.1'" and a suction device 53.2'", which vacuum pump 53.1'" is able to generate a vacuum and which suction device 53.2'" is able to exert a suction force as a result of the vacuum. The suction force is a measured variable MG.

The third machine tool 5 is adapted to handle a workpiece 2 in a process step. The handling may be any type of handling and may be holding, transporting, processing, etc. In the example according to FIGS. 6 and 7, the first tool 53 grips an egg-shaped workpiece 2 by the gripping arms 53.1, 53.2. For this purpose, the first tool 53 exerts a gripping force acting between the gripping arms 53.1, 53.2 onto the workpiece 2. Due to the gripping force, the workpiece 2 is held by the first tool 53 and can be handled.

A respective measurement unit 10, 10', 10" is arranged at each of the plurality of changeable heads 51, 51', 51". According to FIG. 6, three changeable heads 51, 51', 51" and three measurement units 10, 10', 10" are shown, for example. The three measurement units 10, 10', 10" comprise a first measurement unit 10 associated with the first changeable head 51, a second measurement unit 10' associated with the second changeable head 51", and a third measurement unit 10" associated with the third changeable head 51".

Thus, according to FIGS. 6 and 7, the first measurement unit 10 is positioned in the measuring position 15 and the first sensor 11 of the first measurement unit 10 detects the gripping force acting on the first tool 53 as the measured variable MG.

According to FIG. 7, the first changeable head 51 defines a recess 35 that desirably is disposed internally of the first changeable head 51. The first sensor 11 of the first measurement unit 10 associated with the first changeable head 51 is arranged in the recess 35. Preferably, the recess 35 is located inside the first changeable head 51 and the first sensor 11 desirably is completely accommodated within the recess 35. The recess 35 protects and shields the first sensor 11 from detrimental external conditions such as dirt, coolant, electromagnetic radiation, etc. The first changeable head 51 desirably further defines a feedthrough which guides the signal cable 14 out of the recess 35 to the outside of the changeable head 51. The feedthrough is configured so as to be waterproof.

Preferably, the first secondary housing 17 schematically shown in FIG. 7 is arranged on the first changeable head 51. The first secondary housing 17 is fastened to the first changeable head 51 by fastening means such as screws, bolts, etc., not shown in the Figure. The first secondary housing 17 is arranged at a spatial distance from the first sensor 11. Preferably, the first secondary housing 17 is arranged at a constant spatial distance of less than/equal to 10 cm from the first sensor 11.

While the respective sensors 11, 11', 11" and the respective secondary housings 17, 17', 17" are movably arranged on the third machine tool 5 since they are indeed changeably secured with the tool heads 51, 51', 51" to the manipulator 50, the primary housing 27 is arranged at the third machine tool 5 in a stationary manner. Preferably, the primary housing 27 is retained in a stationary manner at the manipulator 50 by retaining means such as screws, bolts, etc., not shown in the Figure. The secondary housing 17, 17', 17" and the primary housing 27 are movable with respect to each other.

For a respective measurement unit 10, 10', 10" positioned in the measuring position 15, the third machine tool 5 is adapted to position the respective secondary housing 17, 17', 17" of the respective measurement unit 10, 10', 10" positioned in the measuring position 15 at a transmission distance 25 from the primary housing 27 schematically shown in FIG. 7. Preferably, the transmission distance 25 is less than/equal to 10 mm. Preferably, the transmission distance 25 between the respective secondary housing 17, 17', 17" of the respective measurement unit 10, 10', 10" positioned in the measuring position 15 and the primary housing 27 is equal to the range of the electromagnetic alternating field EW.

LIST OF REFERENCE NUMERALS

1 measurement chain
2, 2" workpiece
3 first machine tool
4 second machine tool
5 third machine tool means
1, 10', 10" measurement unit
11, 11', 11" sensor
12, 12', 12" converter unit
13, 13', 13" secondary antenna
14, 14', 14" measurement signal cable
15 measuring position
16, 16', 16" preloading means
17, 17', 17" secondary housing
18, 18', 18" retaining means
19, 19', 19" primary interior space
20 evaluation unit
23 primary antenna
24 measurement data line
25 transmission distance
27 primary housing
29 primary interior space
30 turret
31, 31', 31" tool holder
32, 32', 32" attaching means
33, 33', 33" tool
34, 34', 34" clamping means
35, 35', 35" recess
40 carrier unit
41, 41', 41" clamping unit
42, 42', 42" clamping means
43 tool
44, 44', 44" clamping means
45, 45', 45" recess
46 clamping module
50 manipulator
51, 51', 51" changeable head
52, 52', 52" coupling means
53, 53', 53" tool
53.1, 53.2 gripping arms
53.1', 53.2' magnets
53.1" vacuum pump
53.2" vacuum pump
I positioning
II automatic coupling
III automatic generating
IV automatic converting
V automatic transmitting
BT ready for operation time
D12 converter unit-specific data
ED unit data
EW electromagnetic alternating field
ID identification number
KD calibration data
MG measured variable
MD measurement data
MS measurement signals
SD serial number data
SR transmission rate
Z longitudinal axis

What is claimed is:

1. A machine tool configured for successively deploying a plurality of tools to modify a workpiece during a manufacturing process, the machine tool comprising:

a measurement chain which includes an evaluation unit that includes a primary antenna configured to receive electromagnetic transmission over a limited transmission distance and carried at a fixed position by the machine tool;

a turret carried by the machine tool in a manner rotatable relative to the machine tool;

a plurality of tool holders carried spaced apart from each other on the turret, wherein each of the plurality of tool holders is configured to hold a respective one of the plurality of tools;

a plurality of measurement units, wherein each of the plurality of measurement units is carried by a respective one of the plurality of tool holders and is configured and disposed for measuring a measured variable involving the respective tool and the workpiece during the manufacturing process;

wherein each of the respective plurality of measurement units includes a respective sensor, a respective converter unit and a respective secondary antenna;

wherein each respective converter unit and respective secondary antenna of the respective measurement unit are connected to each other and arranged at a spatial distance from the respective sensor and electrically connected by a respective signal cable to the respective sensor;

a plurality of secondary housings carried by the turret, wherein each of the secondary housings contains the respective converter unit and respective secondary antenna of the respective sensor, wherein each of the plurality of secondary housings is spaced apart from each other of the plurality of secondary housings; and wherein each of the respective plurality of measurement units is configured to be positioned in a measuring position where only the respective measurement unit can be coupled to the evaluation unit for establishing a transmission connection between the respective secondary antenna and the primary antenna because only the respective secondary antenna is disposed at a distance within the limited transmission distance of the primary antenna when the respective measurement unit is disposed at the measuring position.

2. The machine tool according to claim 1, wherein the primary antenna is configured to generate an electromagnetic alternating field and transmit the electromagnetic alternating field so generated; wherein a range of the electromagnetic alternating field so generated is limited in such a way that only those respective measurement units that are completely positioned in the measuring position are able to receive the electromagnetic alternating field so generated by the primary antenna.

3. The machine tool according to claim 2, wherein as soon as and as long as the respective secondary antenna receives the electromagnetic alternating field, the respective measurement unit is supplied with electrical energy; and wherein the respective measurement unit is configured to be supplied with sufficient electrical energy to operate the respective measurement unit within a ready for operation time of 20 ms.

4. The machine tool according to claim 3, wherein the secondary antenna is configured to establish the transmission connection to the primary antenna when the respective measurement unit is ready for operation, wherein the respective secondary antenna is configured to transmit an identification number unambiguously identifying the measurement unit to the primary antenna; wherein the primary antenna is configured to receive an identification number and forward the identification number to the evaluation unit; and wherein the evaluation unit is configured to identify the respective measurement unit on the basis of the received and transmitted identification number.

5. The machine tool according to claim 1, wherein for a respective measurement unit positioned in the measuring position, the respective sensor of the respective measurement unit positioned in the measuring position is configured to measure the measured variable that acts onto the tool.

6. The machine tool according to claim 5, wherein the respective tool holders are arranged on the turret and configured to be rotated with the turret about the longitudinal axis of rotation; and wherein the turret is configured to facilitate sequential positioning of the tools on the workpiece one after the other in time.

7. The machine tool according to claim 5, further comprising a primary housing; wherein the primary antenna is arranged in the primary housing; and wherein the secondary housing and the primary housing are configured to be movable relative to each other.

8. The machine tool according to claim 7, wherein the transmission distance is configured to be conducive to transmission of signals between the primary antenna and each of the secondary antennas.

9. The machine tool according to claim 8, wherein the primary antenna is configured to generate an electromagnetic alternating field; and wherein the transmission distance between the secondary housing of the measurement unit positioned in the measuring position and the primary housing is disposed within the range of a detectable magnitude of the electromagnetic alternating field.

10. The machine tool according to claim 5, wherein each respective sensor is a piezoelectric sensor that includes piezoelectric material configured to generate measurement signals in the form of electrical charge; wherein the converter unit includes a charge amplifier that is configured to amplify the electrical charge of the piezoelectric sensor to become an amplified charge; wherein the charge amplifier is configured to convert the amplified charge into an electrical voltage; wherein the converter unit is configured to digitize the electrical voltage into measurement data; wherein the piezoelectric sensor is configured to measure the measured variable with a high dynamic measurement resolution of up to 35 kHz; and wherein the secondary antenna is configured to transmit the measurement data to the primary antenna at a transmission rate of up to 424 kBit/s.

11. The machine tool according to claim 5, wherein the respective sensor is a piezoelectric sensor that includes piezoelectric material configured to generate measurement signals in the form of electrical charge; wherein the converter unit includes a charge amplifier that is configured to amplify the electrical charge of the piezoelectric sensor to become an amplified charge; wherein the charge amplifier is configured to convert the amplified charge into an electrical voltage; wherein the converter unit is configured to digitize the electrical voltage into measurement data; wherein the converter unit is configured to generate unit data that indicates the unit of the measured variable for which the converter unit has converted and digitized measurement signals into measurement data; wherein the measurement unit includes a data memory unit that is configured to store serial number data of the converter unit and calibration data of the sensor; wherein the converter unit is configured to read out the calibration data of the sensor from the data memory unit of the measurement unit; and wherein the secondary antenna is configured to transmit the unit data, the calibration data and the serial number data together with the measurement data to the primary antenna.

12. A machine tool configured for successively deploying a plurality of workpieces to be modified by a tool, the machine tool comprising:

a plurality of clamping units configured to be releasably connected to the machine tool, wherein each of the plurality of clamping units is configured to hold a respective one of the plurality of workpieces;

a carrier unit carried by the machine tool and configured to releasably receive a respective one of the plurality of clamping units;

a measurement chain which includes a plurality of measurement units and an evaluation unit that includes a primary antenna configured to receive electromagnetic transmission over a limited transmission distance and carried at a fixed position by the carrier unit;

wherein each of the plurality of measurement units is carried by a respective one of the plurality of clamping units and configured and disposed for measuring a measured variable resulting from an interaction of the tool and a respective one of the plurality of workpieces;

wherein each of the plurality of measurement units includes a respective one of a plurality of sensors, a respective one of a plurality of converter units, and a respective one of a plurality of secondary antennas;

wherein each respective one of the respective plurality of clamping units holds a respective one of the plurality of workpieces in direct mechanical contact with a respective one of the plurality of sensors;

wherein each respective converter unit and respective secondary antenna of each respective measurement unit are connected to each other and arranged at a spatial distance from the respective sensor and electrically connected by a respective signal cable to the respective sensor;

a plurality of secondary housings, wherein each of the plurality of secondary housings contains a respective converter unit and respective secondary antenna of a respective sensor, wherein each of the plurality of secondary housings is carried by a respective clamping unit in a manner that disposes a spatial distance between the respective one of the plurality of secondary housings and the respective one of the plurality of sensors; and wherein each of the respective plurality of measurement units is configured to be positioned in a measuring position where only the respective measurement unit can be coupled to the evaluation unit for establishing a transmission connection between the respective secondary antenna and the primary antenna because only the respective secondary antenna is disposed at a distance within the limited transmission distance of the primary antenna when the respective measurement unit is disposed at the measuring position.

13. The machine tool according to claim 12, wherein each respective clamping unit is configured to accommodate a respective workpiece; wherein for a measurement unit of the plurality of measurement units positioned in the measuring position, the respective sensor of the respective measurement unit of the plurality of measurement units positioned in the measuring position is configured to measure the measured variable that acts onto the respective workpiece.

14. The machine tool according to claim 13, wherein each of the plurality of clamping units is configured to be changeably attached to the carrier unit.

15. A machine tool configured for handling a workpiece via successively deploying a plurality of changeable heads configured to grip the workpiece, the machine tool comprising:

a manipulator configured for movement relative to the machine tool and further configured for changeably connecting to a selected one of the plurality of changeable heads, wherein each of the plurality of changeable heads includes one of a plurality of tools configured to engage the workpiece with a gripping force;

a measurement chain which includes a plurality of measurement units and an evaluation unit that includes a primary antenna configured to receive electromagnetic transmission over a limited transmission distance and carried at a fixed position by the manipulator;

wherein each of the plurality of measurement units is carried by a respective one of the plurality of changeable heads and configured and disposed for measuring a measured variable resulting from an interaction of the respective one of the plurality of tools and the workpiece;

wherein each of the plurality of measurement units includes a respective one of a plurality of sensors, a respective one of a plurality of converter units, and a respective one of a plurality of secondary antennas;

wherein each respective one of the respective plurality of clamping units holds a respective one of the plurality of workpieces in direct mechanical contact with a respective one of the plurality of sensors;

wherein each respective converter unit and respective secondary antenna of each respective measurement unit are connected to each other and arranged at a spatial distance from the respective sensor and electrically connected by a respective signal cable to the respective sensor;

a plurality of secondary housings, wherein each of the plurality of secondary housings contains a respective converter unit and respective secondary antenna of a respective sensor, wherein each of the plurality of secondary housings is carried by a respective clamping unit in a manner that disposes a spatial distance between the respective one of the plurality of secondary housings and the respective one of the plurality of sensors; and wherein each of the respective plurality of measurement units is configured to be positioned in a measuring position where only the respective measurement unit can be coupled to the evaluation unit for establishing a transmission connection between the respective secondary antenna and the primary antenna because only the respective secondary antenna is disposed at a distance within the limited transmission distance of the primary antenna when the respective measurement unit is disposed at the measuring position.

16. The machine tool according to claim 15, further comprising a plurality of changeable heads; wherein each respective one of the plurality of changeable heads is configured to accommodate a respective tool of a plurality of tools; wherein for a measurement unit positioned in a measuring position, the sensor of the measurement unit positioned in the measuring position is configured to measure the measured variable that acts onto the tool.

17. The machine tool according to claim 16, wherein the machine tool is an industrial robot that includes the manipulator; and wherein each of the plurality of changeable heads is configured to be changeably attached at the manipulator.

* * * * *